(12) United States Patent
Takano

(10) Patent No.: US 7,320,167 B2
(45) Date of Patent: Jan. 22, 2008

(54) LONGITUDINAL BIAS STRUCTURE HAVING STABILITY WITH MINIMAL EFFECT ON OUTPUT

(75) Inventor: Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 11/546,146

(22) Filed: Oct. 11, 2006

(65) Prior Publication Data
US 2007/0028442 A1    Feb. 8, 2007

Related U.S. Application Data

(62) Division of application No. 10/460,087, filed on Jun. 12, 2003, now Pat. No. 7,123,454.

(51) Int. Cl.
*G11B 5/127*    (2006.01)
(52) U.S. Cl. .................................. 29/603.07
(58) Field of Classification Search ............... 29/603.7; 360/324.12
See application file for complete search history.

(56) References Cited

U.S. PATENT DOCUMENTS

| | | |
|---|---|---|
| 5,492,720 A | 2/1996 | Gill et al. |
| 5,508,866 A | 4/1996 | Gill et al. |
| 5,713,122 A | 2/1998 | Aboaf et al. |
| 5,745,978 A | 5/1998 | Aboaf et al. |
| 6,383,574 B1 | 5/2002 | Han et al. |
| 6,417,999 B1 | 7/2002 | Knapp et al. |
| 7,133,264 B2* | 11/2006 | Mauri et al. ........... 360/324.11 |
| 7,159,304 B2* | 1/2007 | Arasawa et al. ......... 29/603.16 |
| 7,178,221 B2* | 2/2007 | Sato ........................ 29/603.07 |
| 7,187,524 B2* | 3/2007 | Lin et al. ................ 360/324.12 |

* cited by examiner

*Primary Examiner*—Angel Castro
(74) *Attorney, Agent, or Firm*—Saile Ackerman LLC; Stephen B. Ackerman

(57) ABSTRACT

It is necessary to stabilize the free layer of GMR or TMR devices by providing a longitudinal bias field. As read tracks become very narrow, this field can drastically reduce the strength of the output signal. This problem has been overcome by adding an additional, compensatory, bias layer. This layer is permanently magnetized in the same direction as the main bias magnet. Through control of the magnetization strength and location of the compensatory bias layer, cancellation of the field induced in the free layer, by the main bias layers, is achieved. A process for manufacturing the devices is also described.

8 Claims, 9 Drawing Sheets

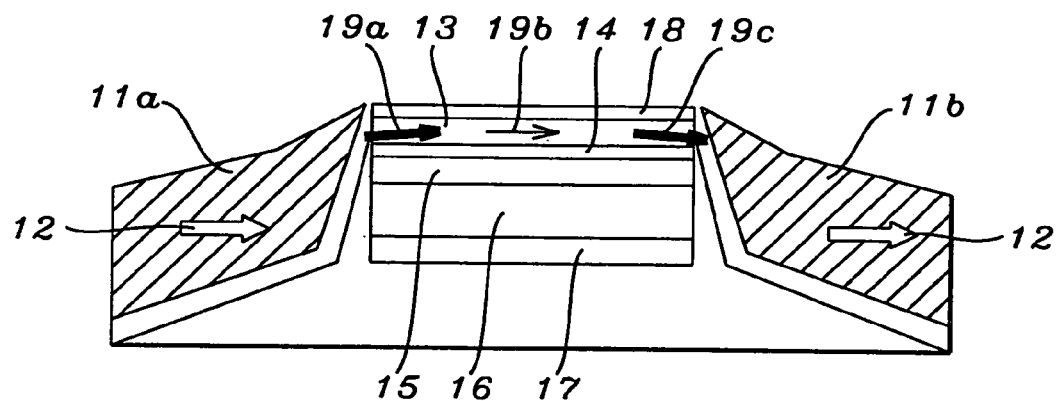
*FIG. 1 — Prior Art*
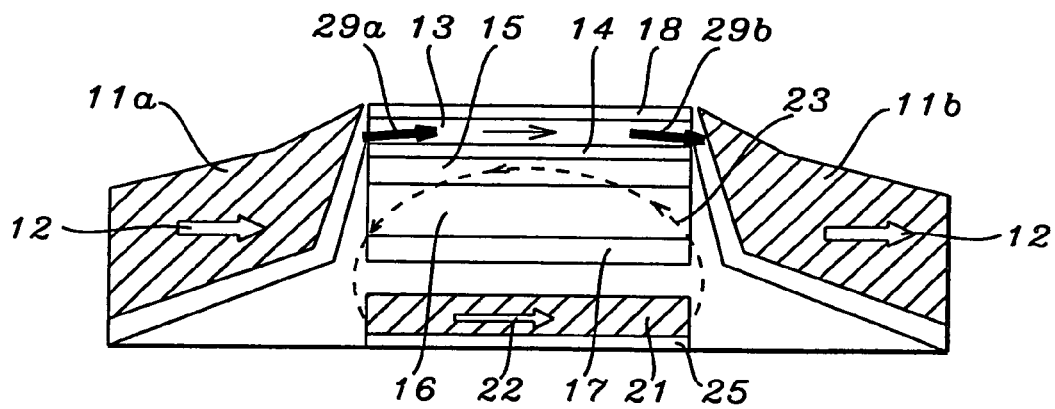
*FIG. 2a*

LONGITUDINAL BIAS STRUCTURE HAVING STABILITY WITH MINIMAL EFFECT ON OUTPUT

This is a divisional application of U.S. patent application Ser. No. 10/460,087, filed on Jun. 12, 2003, now U.S. Pat. No. 7,123,454 which is herein incorporated by reference in its entirety, and assigned to a common assignee.

FIELD OF THE INVENTION

The invention relates to the general field of magnetic disk storage with particular reference to read heads and specifically to longitudinal bias stabilization thereof.

BACKGROUND OF THE INVENTION

The principle governing the operation of most current magnetic read heads is the change of resistivity of certain materials in the presence of a magnetic field (magneto-resistance or MR). Magneto-resistance can be significantly increased by means of a structure known as a spin valve or SV. The resulting increase (known as giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve are a low coercivity (free) ferromagnetic layer, a non-magnetic spacer layer, and a high coercivity ferromagnetic layer. The latter is usually formed out of a soft ferromagnetic layer that is pinned magnetically by a nearby layer of antiferromagnetic material. Alternatively, a synthetic antiferromagnet (formed by sandwiching an antiferromagnetic coupling layer between two antiparallel ferromagnetic layers) may be used to replace the ferromagnetic pinned layer.

When the free layer is exposed to an external magnetic field, the direction of its magnetization is free to rotate according to the direction of the external field. After the external field is removed, the magnetization of the free layer will stay at a direction, dictated by the minimum energy state, which is determined by the crystalline and shape anisotropy, current field, coupling field and demagnetization field. If the direction of the pinned field is parallel to the free layer, electrons passing between the free and pinned layers, suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a spin valve is typically 8-20%.

First generation GMR devices were designed so as to measure the resistance of the free layer for current flowing in the plane (CIP) of the film. However, as the quest for ever greater densities continues, devices that measure current flowing perpendicular to the plane (CPP) have begun to emerge. For devices depending on in-plane current, the signal strength is diluted by parallel currents flowing through the other layers of the GMR stack, so these layers should have resistivities as high as possible while the resistance of the leads into and out of the device need not be particularly low. By contrast, in a CPP device, the resistivity of both the leads and the other gMR stack layers dominate and should be as low as possible.

A device that is particularly well suited to the CPP design is the magnetic tunneling junction (MTJ) in which the layer that separates the free and pinned layers is a non-magnetic insulator, such as alumina or silica. Its thickness needs to be such that it will transmit a significant tunneling current. The principle governing the operation of the MTJ is the change of resistivity of the tunnel junction between two ferromagnetic layers. When the magnetization of the two ferromagnetic layers is in opposite directions, the tunneling resistance increases due to a reduction in the tunneling probability. The change of resistance is typically about 40%. The device is also referred to as a TMR (tunnel magneto-resistance) device Although the layers enumerated above are all that is needed to produce the GMR or TMR effects, additional problems remain. In particular, there are certain noise effects associated with these structures. Magnetization in a layer can be irregular because of reversible breaking of magnetic domain walls, leading to the phenomenon of Barkhausen noise. The solution to this problem has been to provide a device structure conducive to ensuring that the free layer is a single domain so that the domain configuration remains unperturbed after fabrication and under normal operation.

A typical prior art arrangement for longitudinal biasing is illustrated in schematic cross-section in FIG. 1. Seen there are seed layer 17, pinning layer 16, pinned layer 15, free layer 13, non-magnetic layer 14, and capping layer 18. If layer 14 is conductive, the device is a GMR unit while if it is a dielectric, the device is a TMR unit. Two opposing permanent magnets (PM) 11a and 11b, magnetized in the direction shown by arrows 12, are located at the sides of the device.

As track widths grow very small (<0.2 microns), the above biasing configuration has been found to no longer be suitable since the strong magnetostatic coupling at the track edges also pins the magnetization of the free layer (symbolically illustrated by arrows 19a, 19b, and 19c) which drastically reduces the GMR or TMR sensor sensitivity. Even for read track widths as high as 0.1-0.2 um, the bias field strength is significant at the track center where it interferes with the free-layer magnetization change. Additionally, this reduced sensitivity at the track center leads to a poor track profile shape at the output. This in turn leads to side reading so the magnetic read width (MRW) becomes too wide.

The present invention provides a solution to this problem.

A routine search of the prior art was performed with the following references of interest being found:

Kanbe et al. in U.S. Pat. No. 6,383,574 and Knapp et al. in U.S. Pat. No. 6,417,999, describe a bias layer in addition to the permanent magnetic layer while U.S. Pat. Nos. 5,745,978 and 5,713,122 (Aboaf et al.) disclose a soft film biased sensor layer and hard bias stabilizing magnets. Additionally, U.S. Pat. Nos. 5,508,866 and 5,492,720 (gill et al.) show transverse and longitudinal bias layers.

SUMMARY OF THE INVENTION

It has been an object of at least one embodiment of the present invention to provide a magnetic read head device whose output is both stable as well as unaffected by the steps taken to achieve said stability.

Another object of at least one embodiment of the present invention has been that said device be a CIP GMR device, a CPP GMR device, or a TMR device.

Still another object of at least one embodiment of the present invention has been to provide a process for manufacturing said devices.

These objects have been achieved by adding to existing designs of GMR and TMR devices an additional, compensatory, bias layer. This layer, which may be located either above or below the free layer, is permanently magnetized in the same direction as the permanent magnets (or antiferromagnetically pinned soft magnets) used to achieve longitudinal stability. Through control of the magnetization strength and location of the compensatory bias layer, cancellation of the field induced in the free layer by the main bias layers is achieved. This field cancellation is due to the presence of a return flux associated with the compensatory bias layer. The return field that the compensatory bias layer provides may also be produced by the exchange field of an antiferromagnetic layer that is stacked on top of the free layer, and coupled to it either directly or indirectly, the coupled direction being opposite to that produced by the permanent magnets.

BRIEF DESCRIPTION OF THE DRAWINGS

FIG. 1 shows how, as taught by the prior art, longitudinal stabilization is achieved by means of a pair of permanent magnet layers that flank the device in question.

FIGS. 2a, 2b, and 2c show how signal loss from the free layer of a device stabilized as shown in FIG. 1 can be eliminated.

DESCRIPTION OF THE PREFERRED EMBODIMENTS

The basic principle of the present invention is schematically illustrated in FIG. 2a. As can be seen, the structure shown in FIG. 1 has been modified by the addition of compensatory bias layer 21 located on seed layer 25; it has been magnetized in direction 22 and has been placed near the GMR or TMR sensor. As illustrated in FIG. 2a, it is most conveniently located below the sensor unit.

Figure 2B:
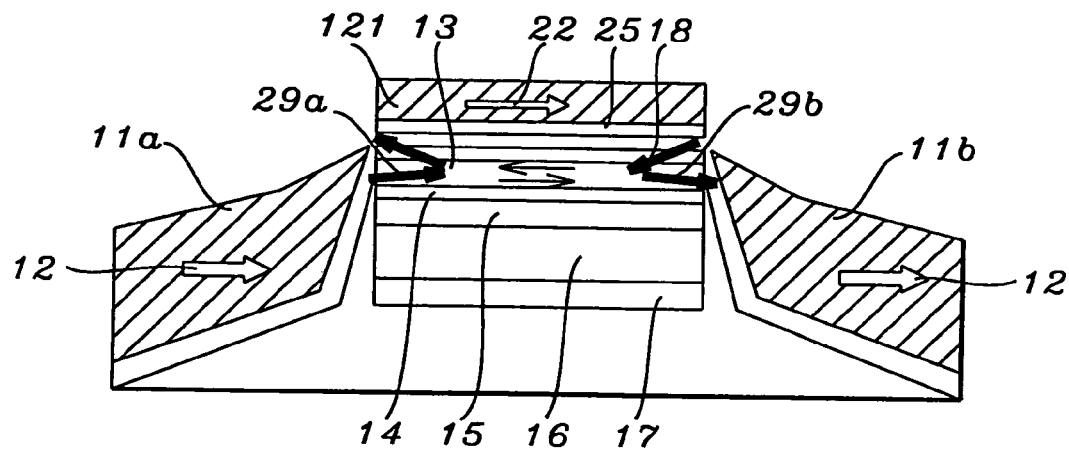

The compensatory bias layer could, instead, be located a similar distance above the sensor unit, should this be preferred. This is shown in FIG. 2b where the compensatory bias layer has been given the designation 121.

Figure 2C:
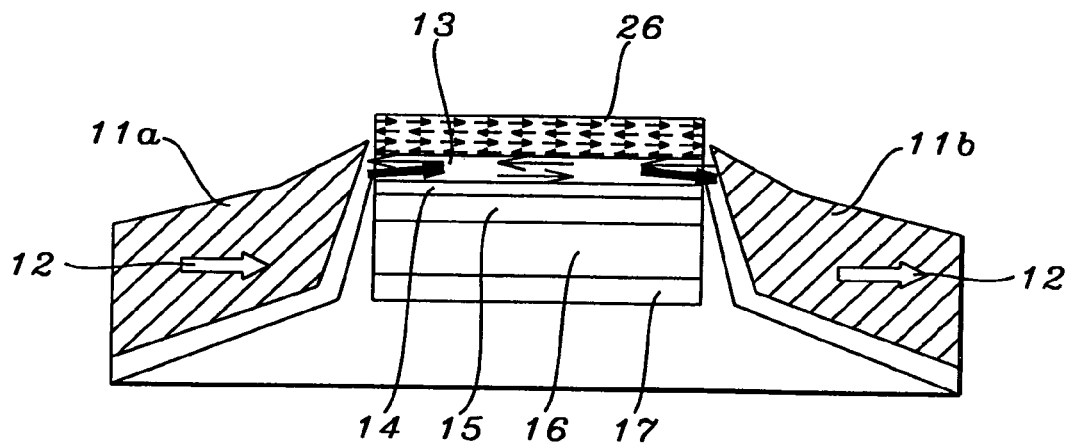

A third possibility is illustrated in FIG. 2c. Here, the return field that the compensatory bias layer provides is produced by the exchange field of an antiferromagnetic layer 26, such as IrMn, that is stacked on top of the free layer, and coupled to it either directly or indirectly, the coupled direction being opposite to that produced by the permanent magnets.

Figure 3:
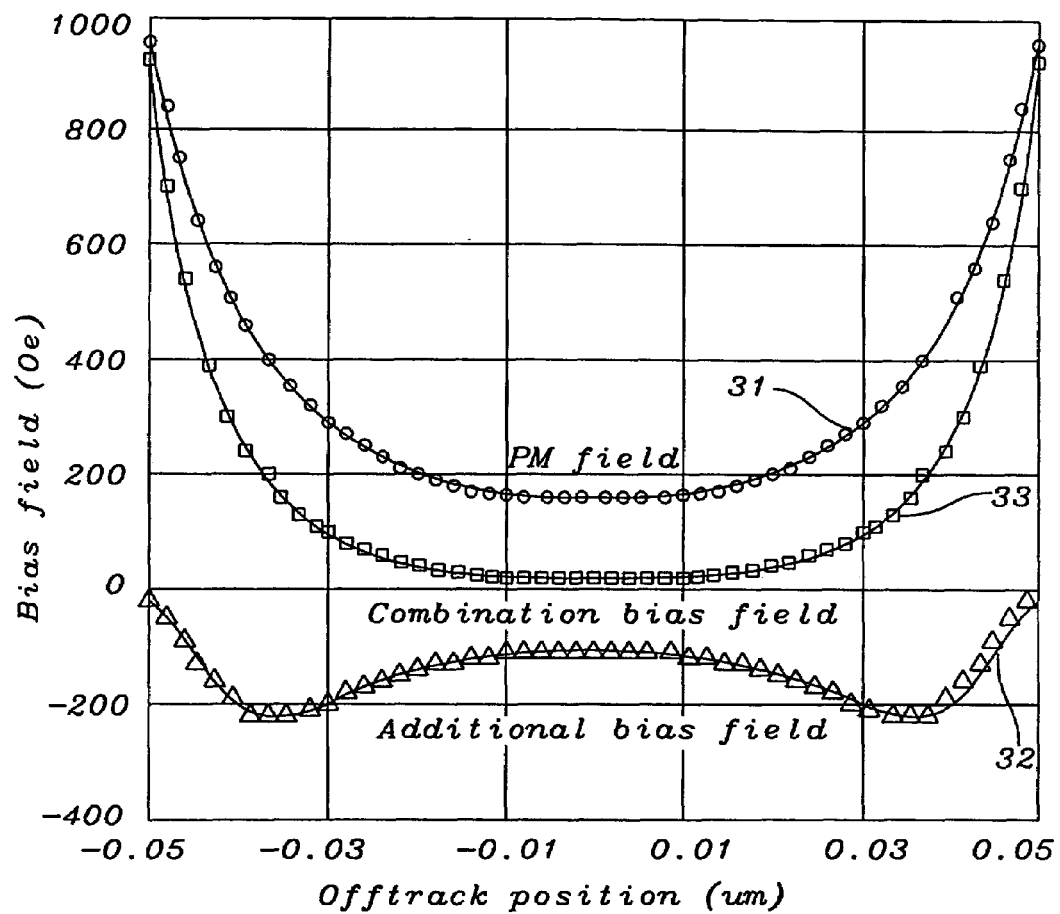
FIG. 3 shows three field strength plots vs. off-track position for a compensatory bias field, a prior art bias field, and a combination of the first two fields.

Returning now to FIG. 2a, since bias compensatory layer 21 has been given magnetization 22, there is a return flux 23 whose direction is the opposite to that of 12 (the PM magnetization). The result is the cancellation of the PM field, particularly at the center of the free layer. This is illustrated in FIG. 3 which shows the longitudinal bias field distribution for a free layer with a 0.1_m track width. Curve 31 is for the original PM field. Although it is greatest at the track edge, there still remains a field of over 100 Oe even in the track center. Curve 32 is the field due to return flux 23 while curve 33 is the result of combining curves 31 and 32. As can be seen, the field is almost zero out to the track edge but rises steeply thereafter so the stabilizing effect of the PM is not diminished, making this an ideal bias distribution since it provides a large output, a stable reading operation and a narrow magnetic track width For any particular device, fine tuning of the bias field distribution is readily achieved through adjustment of one or more of the following:

1. Compensatory bias layer thickness (typically between about 0.005 and 0.02 microns).
2. Compensatory bias layer magnetization (typically between about 600 and 1,600 emu/cc).
3. Compensatory bias layer width (typically between about 0.6 and 1.3 times that of the free layer).
4. Distance between the compensatory bias layer and the free layer (typically between about 0.005 and 0.04 microns).

We now describe processes for the manufacture of three embodiments of the present invention. Since the detailed layer structure needed to produce the GMR or TMR effects are not part of the invention, we will refer in each case simply to GMR or TMR stacks instead of listing the full set of layers. The description of these processes will also serve to disclose the structure of the present invention.

1$^{st}$ EMBODIMENT

Figure 4:
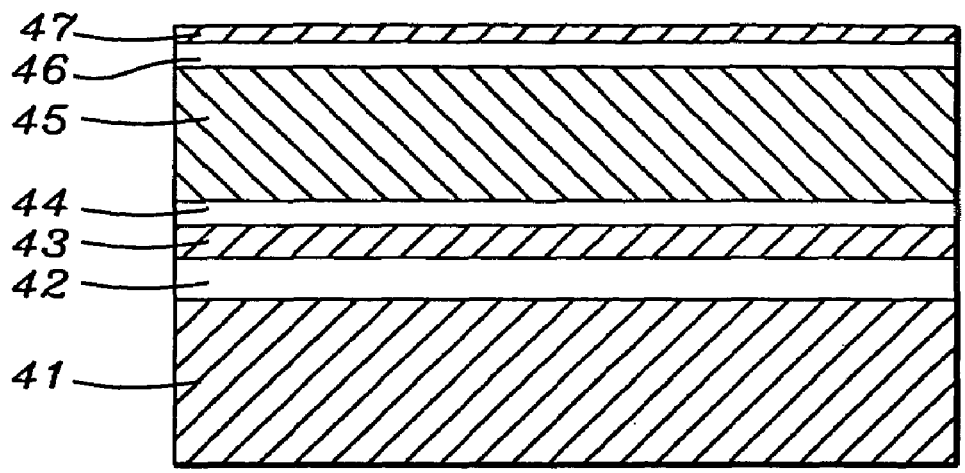
FIGS. 4-9 show process steps for manufacturing a CIP GMR device that incorporates the teachings of the present invention.

Referring now to FIG. 4, the process of the first embodiment begins with the provision of lower magnetic shield 41 and depositing thereon dielectric layer 42.

Now follows a key feature of the invention, namely the deposition onto dielectric layer 42 of compensatory bias layer 43. Dielectric layer 44 is now deposited onto compensatory bias layer 43 followed by the deposition onto layer 43 of GMR stack 45 whose top layer is a conductive non-magnetic layer (not shown), this being followed by the deposition of free layer 46 and capping layer 47.

Figure 5:
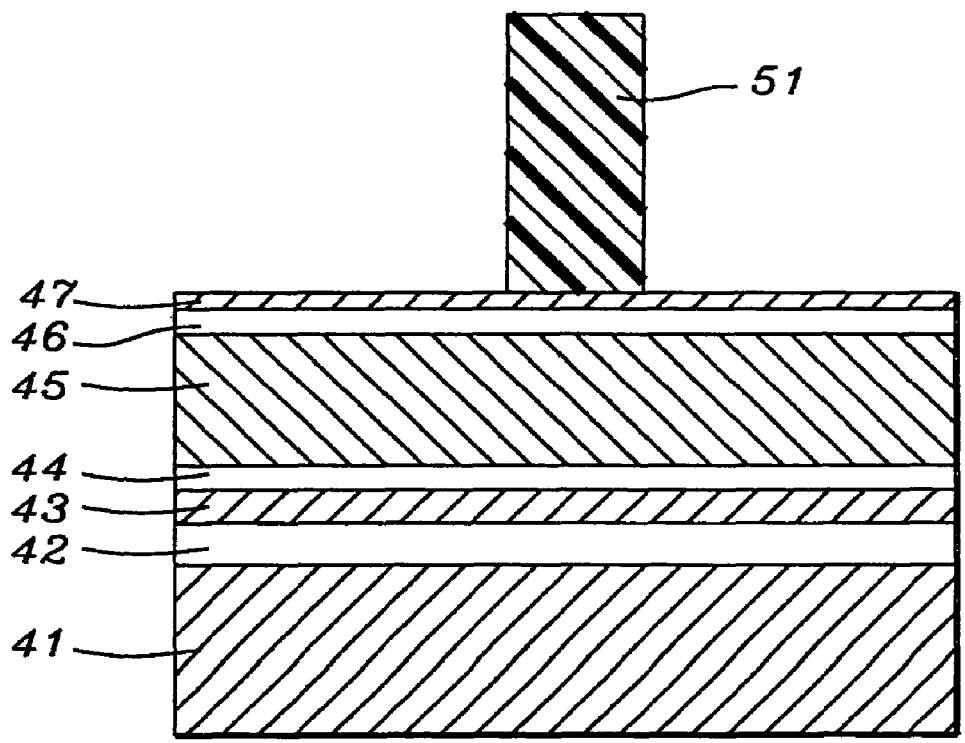
Figure 6:
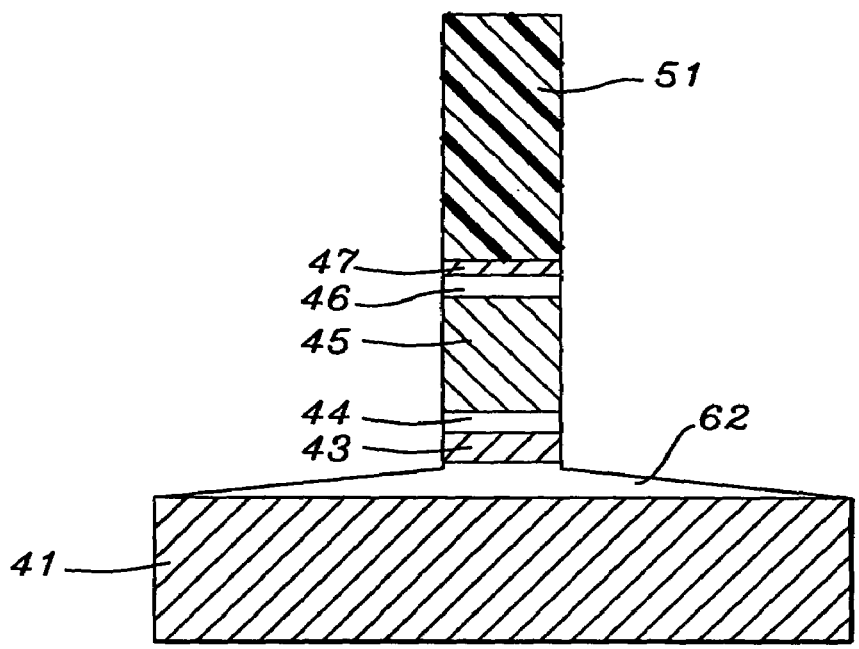

Referring next to FIG. 5, photoresist mask 51 is now formed on capping layer 47 in order to define the width of the read head. Then, as shown in FIG. 6, a pedestal, consisting of layers 43 through 47, is formed by means of ion beam etching (IBE). This pedestal rests on sloping dielectric base 62 (originally layer 42 prior to being reshaped).

Figure 7:
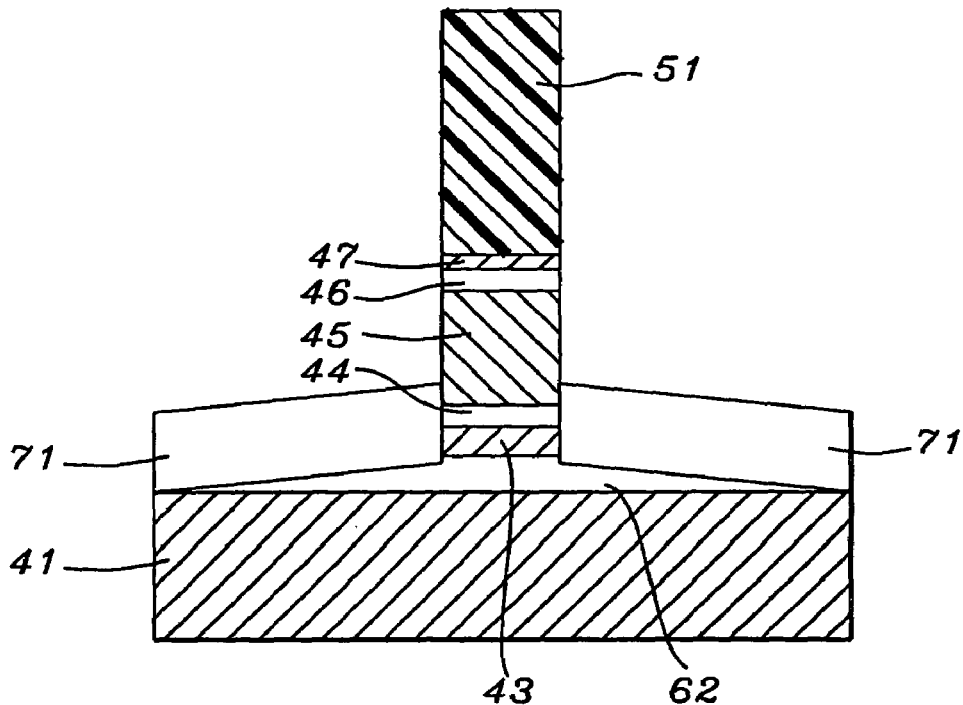
Figure 8:
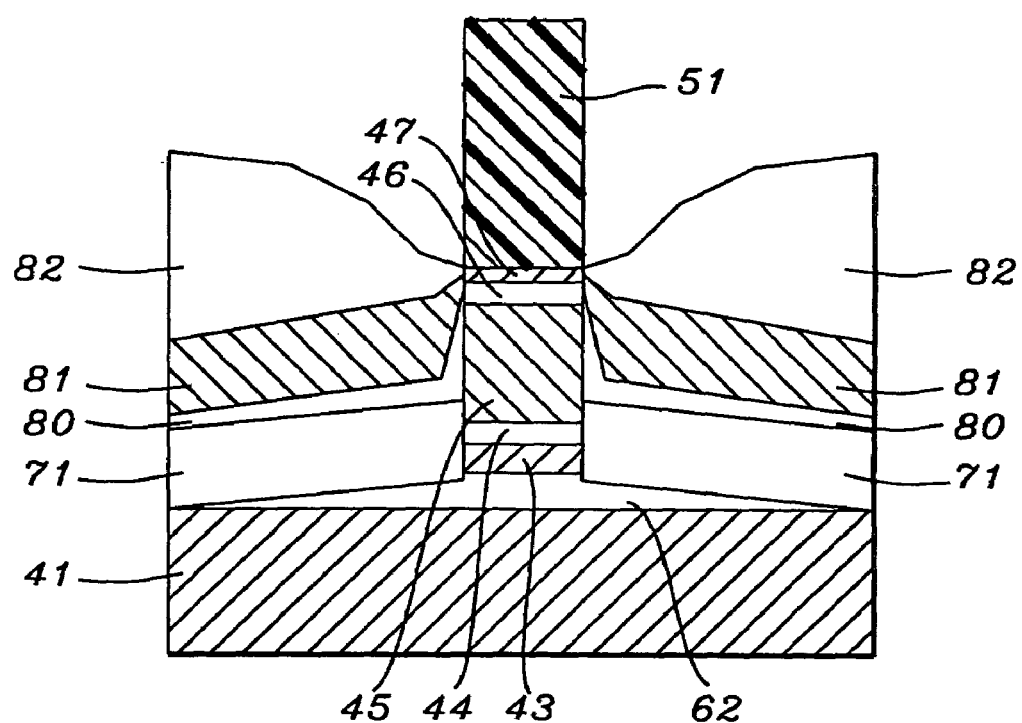

Moving on to FIG. 7, with mask 51, still in place, dielectric layer 71 is deposited onto layer 62 so that it abuts the vertical sidewalls of the afore-mentioned pedestal. This is followed by the deposition of seed layer 80 over which is deposited permanent magnet layer 81. As can be seen in FIG. 8, the thickness of layer 81 (typically between about 0.01 and 0.03 microns) is such that its top surface is almost flush with free layer 46 (actually, slightly below it). Also shown in FIG. 8 is in-plane conductive lead layer 82 that precisely abuts the edges of free layer 46. Following deposition of 82, photoresist 51 is lifted off.

Figure 9:
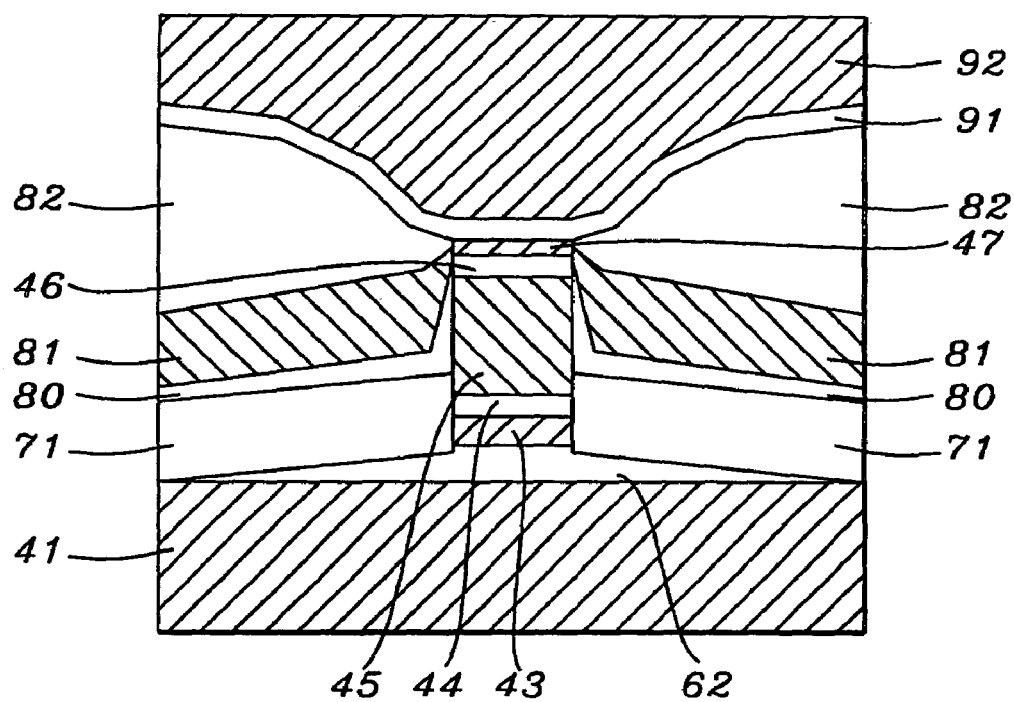

Then, as shown in FIG. 9, the process of the first embodiment concludes with the deposition of dielectric layer 91 onto which is deposited upper magnetic shield 92, thereby forming a CIP GMR device. At this point, permanent magnets 81 and compensatory bias layer 43 are magnetized in the same longitudinal direction.

2$^{nd}$ EMBODIMENT

Figure 10:
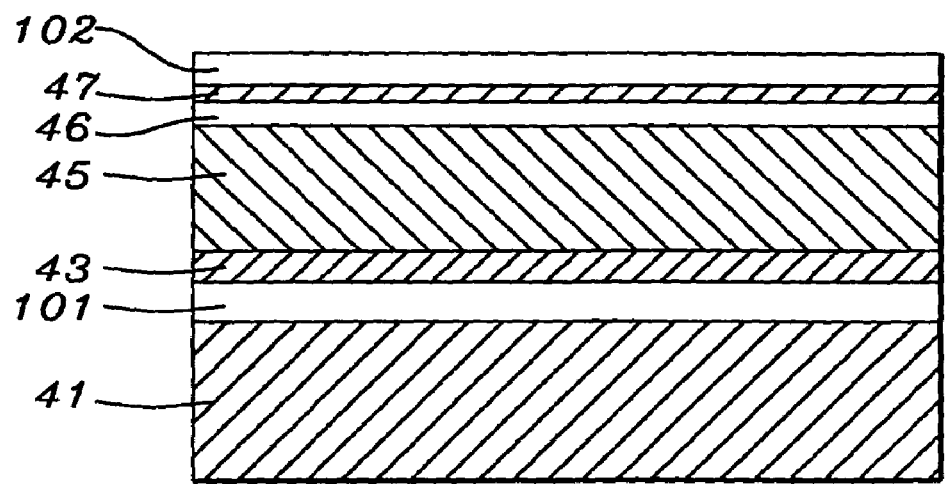
FIGS. 10-15 show process steps for manufacturing a CPP GMR device or a TMR device that incorporates the teachings of the present invention.

Referring now to FIG. 10, the process of the second embodiment begins with the provision of lower magnetic shield 41 and depositing thereon lower conducting lead layer 101.

Now follows a key feature of the invention, namely the deposition onto conducting lead layer 101 of compensatory bias layer 43. Next is the deposition. onto layer 43, of GMR stack 45 whose top layer is a conductive non-magnetic layer (not shown), this being followed by the deposition of free layer 46 and capping layer 47.

Figure 11:
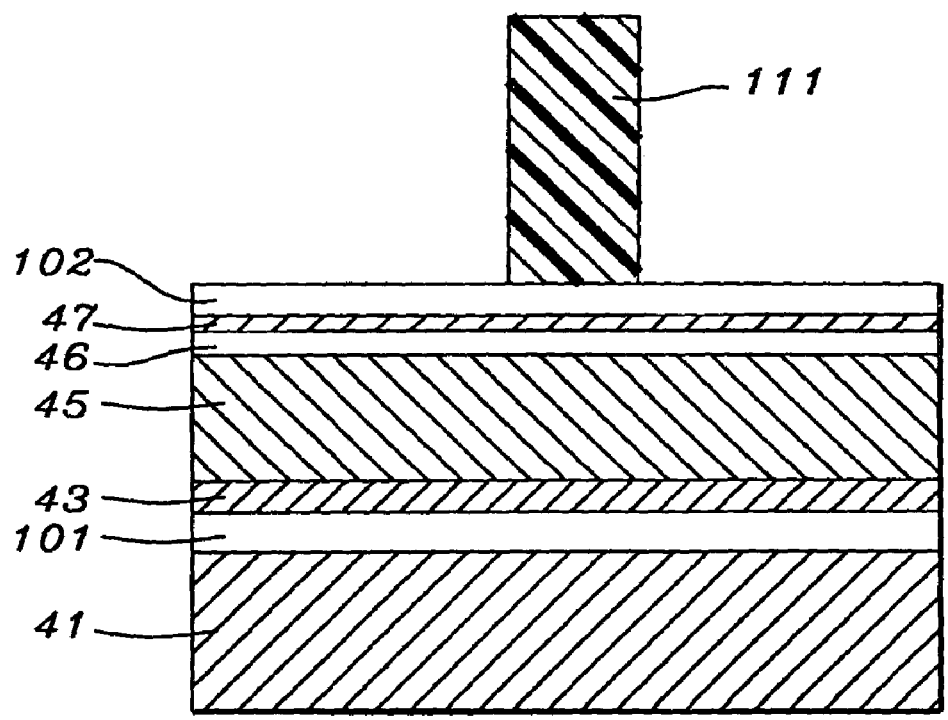
Figure 12:
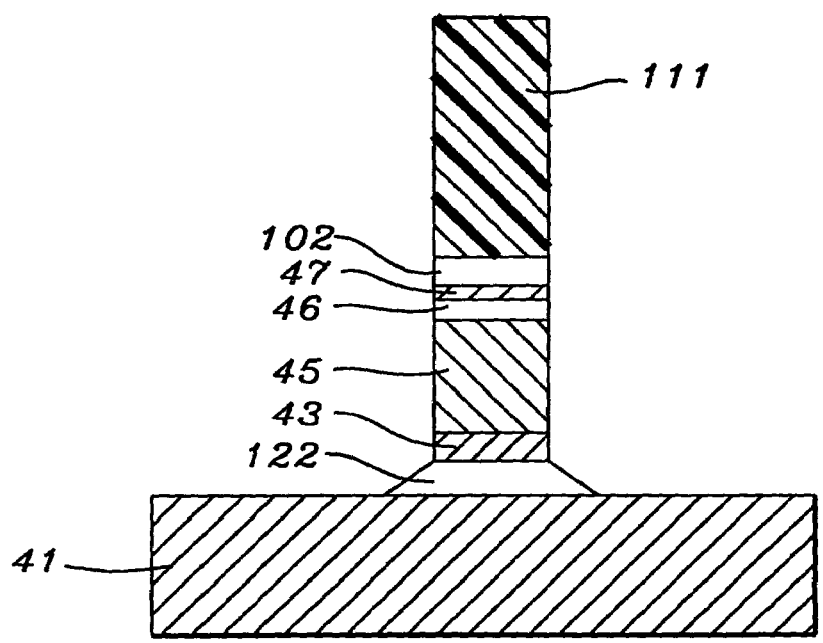

Referring next to FIG. 11, photoresist mask 111 is now formed on capping layer 47 in order to define the width of the read head. Then, as shown in FIG. 12, a pedestal, consisting of layers 43 through 47, as well as 102, is formed by means of IBE. This pedestal rests on sloping dielectric base 122 (originally layer 101 prior to being reshaped).

Figure 13:
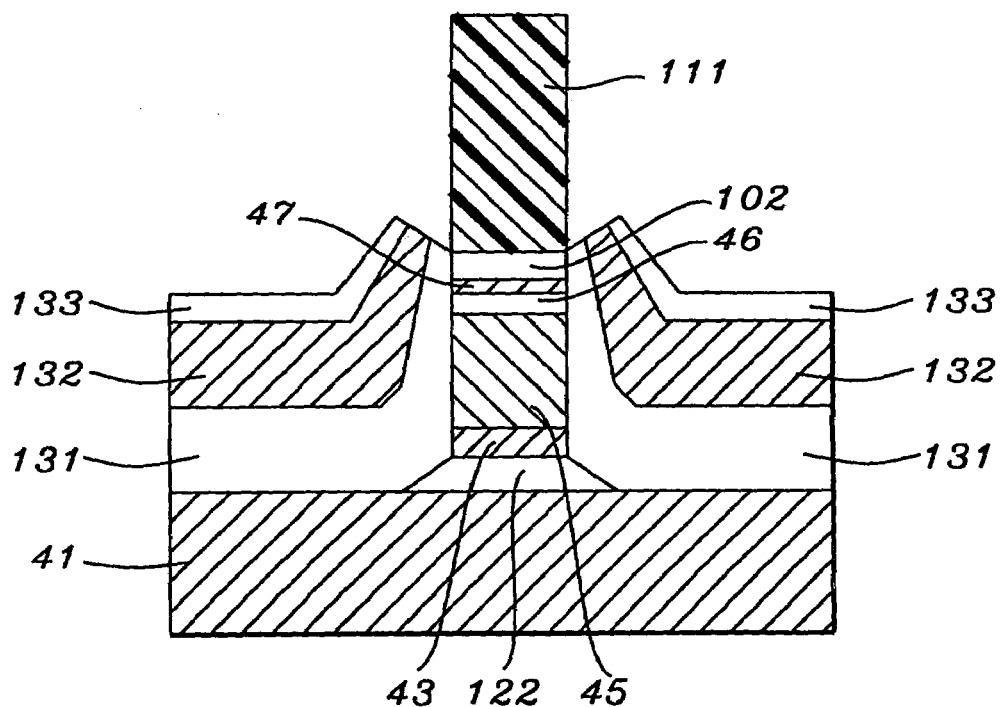

Moving on to FIG. 13, with mask 111, still in place, dielectric layer 131 is deposited onto layer 41, as well as the sloping sidewalls of layer 122, so that it abuts the vertical sidewalls of the afore-mentioned pedestal. This is followed by the deposition of permanent magnet layer 132 and then additional dielectric layer 133. As can be seen in FIG. 13, the thickness of layer 131 (typically between about 0.007 and 0.025 microns) is such that its top surface is flush with upper conducting lead layer 102.

Figure 14:
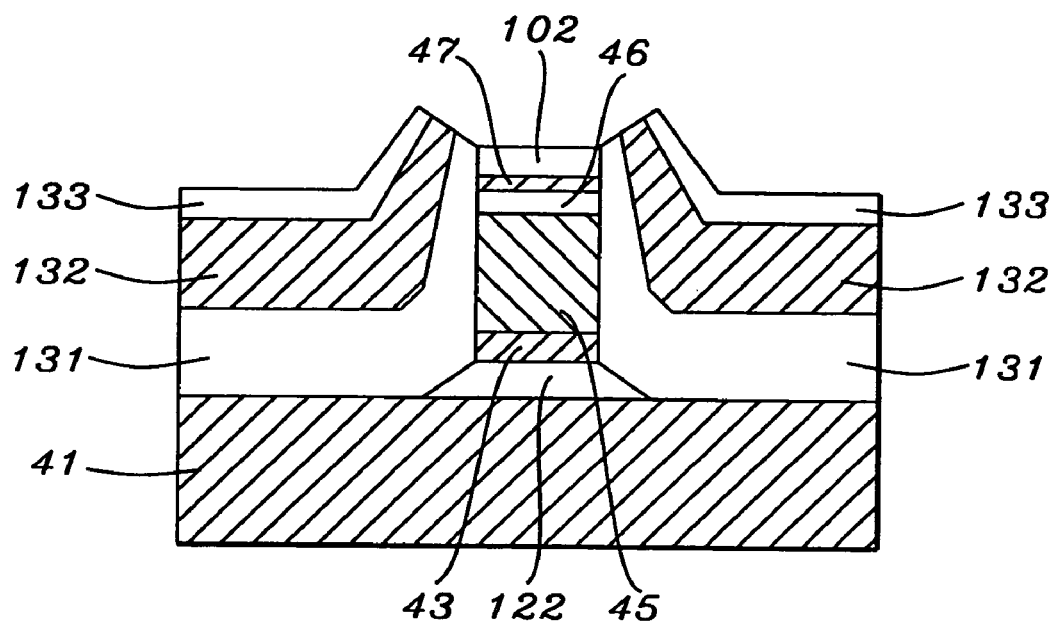
Figure 15:
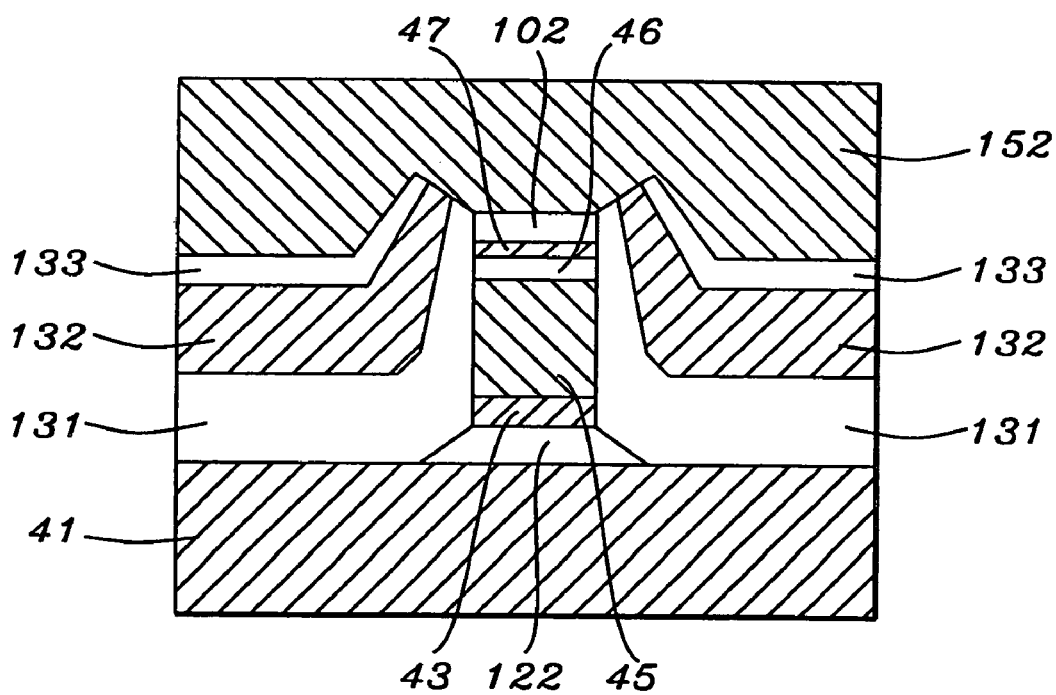

As seen in FIG. 14, photoresist mask 111 is now fully removed (along with any material that had been deposited thereon). As shown in FIG. 15, the process of the second embodiment concludes with the deposition of upper magnetic shield 152 on all exposed surfaces.

3$^{rd}$ EMBODIMENT

This embodiment is identical to the process described above for the second embodiment with the important difference that element 45 in FIGS. 10-15 now represents a TMR, as opposed to a GMR, stack. Consequently, the topmost layer of the stack (see layer 14 in FIG. 1, for example) is now a dielectric (whose thickness is low enough to allow tunneling) rather than a conductor.

We conclude by noting that the magnetic properties of thin films are known to be very sensitive to a number of factors in addition to their composition. Said factors include, but may not be limited to, thickness, deposition conditions, annealing treatments (particularly in the presence of a magnetic field), immediate underlayer, and immediate overcoating. Thus, as a general rule, the parameters that characterize the layers named in the claims to be recited below should be regarded as critical rather than merely optimal.

While the invention has been particularly shown and described with reference to the preferred embodiments described above, it will be understood by those skilled in the art that various changes in form and details may be made without departing from the spirit and scope of the invention.

What is claimed is:

1. A process for manufacturing a CPP GMR read head, comprising:

providing a lower magnetic shield;

depositing a lower conductive lead layer on said lower magnetic shield;

depositing a compensatory bias layer on said lower conductive lead layer;

depositing, on said compensatory bias layer, a GMR stack whose top layer is a conductive non-magnetic layer;

depositing a free layer on said top layer;

depositing an upper conductive lead layer on said free layer;

coating said upper conductive lead layer with a layer of photoresist and then patterning said photoresist to form a mask that defines said read head;

using said mask, etching unprotected parts of said upper conductive lead layer, said free layer, said GMR stack, said compensatory bias layer, and said lower conductive lead layer, thereby forming a pedestal, that has vertical sidewalls as far down as said lower conductive lead layer and sloping sidewalls formed from said lower conductive lead layer;

depositing a first dielectric layer that lies on said lower magnetic shield and sloping side walls and that abuts all of said vertical sidewalls;

on said first dielectric layer, depositing a permanent magnet layer;

depositing a second dielectric layer on said permanent magnet layer;

then removing all photoresist; and depositing an upper magnetic shield.

2. The process recited in claim 1 wherein said compensatory bias layer is CoPt, CoCrPt, antiferromagnetically coupled CoFe, or a CoFe/Ru/CoFe laminate.

3. The process recited in claim 1 wherein said compensatory bias layer is between about 0.005 and 0.02 microns thick.

4. The process recited in claim 1 wherein said compensatory bias layer is between about 0.02 and 0.04 microns below said free layer.

5. A process for manufacturing a TMR read head, comprising:

providing a lower magnetic shield;

depositing a lower conductive lead layer on said lower magnetic shield;

depositing a compensatory bias layer on said lower conductive lead layer;

depositing, on said compensatory bias layer, a TMR stack whose top layer is a non-magnetic tunneling dielectric layer;

depositing a free layer on said top layer;

depositing an upper conductive lead layer on said free layer;

coating said upper conductive lead layer with a layer of photoresist and then patterning said photoresist to form a mask that defines said read head;

using said mask, etching unprotected parts of said upper conductive lead layer, said free layer, said TMR stack, said compensatory bias layer, and said lower conductive lead layer, thereby forming a pedestal, that has vertical sidewalls as far down as said lower conductive lead layer and sloping sidewalls formed from said lower conductive lead layer;

depositing a first dielectric layer that lies on said lower magnetic shield and sloping side walls and that abuts all of said vertical sidewalls;

on said first dielectric layer, depositing a permanent magnet layer;

depositing a second dielectric layer on said permanent magnet layer;

then removing all photoresist; and depositing an upper magnetic shield.

6. The process recited in claim 5 wherein said compensatory bias layer is CoPt, CoCrPt, antiferromagnetically coupled CoFe, or a CoFe/Ru/CoFe laminate.

7. The process recited in claim 5 wherein said compensatory bias layer is between about 0.005 and 0.02 microns thick.

8. The process recited in claim 5 wherein said compensatory bias layer is between about 0.02 and 0.04 microns below said free layer.

* * * * *